(12) United States Patent
Liu et al.

(10) Patent No.: US 7,445,378 B2
(45) Date of Patent: Nov. 4, 2008

(54) PERFORMANCE TESTING APPARATUS FOR HEAT PIPES

(75) Inventors: Tay-Jian Liu, Tu-Cheng (TW);
Chao-Nien Tung, Tu-Cheng (TW);
Chih-Hsien Sun, Tu-Cheng (TW);
Chuen-Shu Hou, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 120 days.

(21) Appl. No.: 11/309,177

(22) Filed: Jul. 6, 2006

(65) Prior Publication Data
US 2007/0116088 A1     May 24, 2007

(51) Int. Cl.
*G01N 25/20* (2006.01)
*G01K 1/14* (2006.01)
*G01K 17/06* (2006.01)

(52) U.S. Cl. .................. 374/29; 374/43; 374/5; 374/57; 374/147; 374/208

(58) Field of Classification Search .............. None
See application file for complete search history.

(56) References Cited

U.S. PATENT DOCUMENTS

| | | | | |
|---|---|---|---|---|
| 3,453,865 A | * | 7/1969 | Reiter et al. | 374/33 |
| 4,067,237 A | * | 1/1978 | Arcella | 73/204.23 |
| 4,595,297 A | * | 6/1986 | Liu et al. | 374/29 |
| 5,248,198 A | * | 9/1993 | Droege | 374/7 |
| 5,355,683 A | * | 10/1994 | Taylor | 62/51.1 |
| 5,707,152 A | * | 1/1998 | Krywitsky | 374/208 |
| 7,147,368 B2 | * | 12/2006 | Chien | 374/147 |
| 2001/0053172 A1 | * | 12/2001 | Sakowsky et al. | 374/147 |
| 2008/0149208 A1 | * | 6/2008 | Kurara et al. | 138/106 |

FOREIGN PATENT DOCUMENTS

| | | | |
|---|---|---|---|
| JP | 57086736 A | * | 5/1982 |
| TW | M279851 | | 11/2005 |

\* cited by examiner

*Primary Examiner*—Gail Verbitsky
(74) *Attorney, Agent, or Firm*—Frank R. Niranjan

(57) ABSTRACT

A performance testing apparatus for a heat pipe includes an immovable portion having a cooling structure defined therein for cooling a heat pipe requiring test. A movable portion is capable of moving relative to the immovable portion. A receiving structure is defined between the immovable portion and the movable portion for receiving the heat pipe therein. A positioning structure extends from at least one of the immovable portion and the movable portion and avoids the movable portion from deviating from the immovable portion to ensure that the receiving structure is capable of precisely receiving the heat pipe therein. At least a temperature sensor is attached to at least one of the immovable portion and the movable portion for thermally contacting the heat pipe in the receiving structure to detect a temperature of the heat pipe.

14 Claims, 7 Drawing Sheets

PERFORMANCE TESTING APPARATUS FOR HEAT PIPES

FIELD OF THE INVENTION

The present invention relates generally to testing apparatuses, and more particularly to a performance testing apparatus for heat pipes.

DESCRIPTION OF RELATED ART

It is well known that a heat pipe is generally a vacuum-sealed pipe. A porous wick structure is provided on an inner face of the pipe, and at least a phase changeable working media employed to carry heat is contained in the pipe. Generally, according to positions from which heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires test before being used. The maximum heat transfer capacity (Qmax) and the temperature difference ($\Delta T$) between the evaporating section and the condensing section are two important parameters for evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

Conventionally, a method for testing the performance of a heat pipe is first to insert the evaporating section of the heat pipe into liquid at constant temperature; after a predetermined period of time and temperature of the heat pipe will become stable, then a temperature sensor such as a thermocouple, a resistance thermometer detector (RTD) or the like is used to measure $\Delta T$ between the liquid and the condensing section of the heat pipe to evaluate the performance of the heat pipe. However, Rth and Qmax can not be obtained from this test, and the performance of the heat pipe can not be reflected exactly by this test.

Referring to FIG. 4, a conventional performance testing apparatus for heat pipes is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. Simultaneously, by controlling flow rate and temperature of cooling liquid flowing through the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions of the heat pipe 2.

However, in the test, the conventional testing apparatus has drawbacks as follows: a) it is difficult to accurately determine lengths of the evaporating section 2a and the condensing section 2b which are important factors in determining the performance of the heat pipe 2; b) heat transference and temperature measurement may easily be effected by environmental conditions; c) it is difficult to achieve sufficiently intimate contact between the heat pipe and the heat source and between the heat pipe and the heat sink, which results in unsteady performance test results of the heat pipe. Furthermore, due to fussy and laborious assembly and disassembly in the test, the testing apparatus can be only used in the laboratory, and can not be used in the mass production of heat pipes.

In mass production of heat pipes, a large number of performance tests are needed, and the apparatus is used usually over a long period of time; thus, the apparatuses not only requires good testing accuracy, but also requires easy and accurate assembly with the heat pipes to be tested. The testing apparatus affects the yield and cost of the heat pipes directly; thus testing accuracy, facility, speed, consistency, reproducibility and reliability need to be considered when choosing the testing apparatus. Therefore, the conventional testing apparatus needs to be improved in order to meet the demand for testing during mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a cooling structure defined therein for removing heat from a condensing section of a heat pipe requiring test. A movable portion is capable of moving relative to the immovable portion. A receiving structure is defined between the immovable portion and the movable portion for receiving the condensing section of the heat pipe therein. A positioning structure extends from at least one of the immovable portion and the movable portion and avoids the movable portion deviating from the immovable portion to ensure the receiving structure being capable of receiving the heat pipe. At least a temperature sensor is attached to at least one of the immovable portion and the movable portion for thermally contacting the heat pipe in the receiving structure for detecting temperature of the heat pipe.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The compo

DETAILED DESCRIPTION OF THE INVENTION

Figure 1:
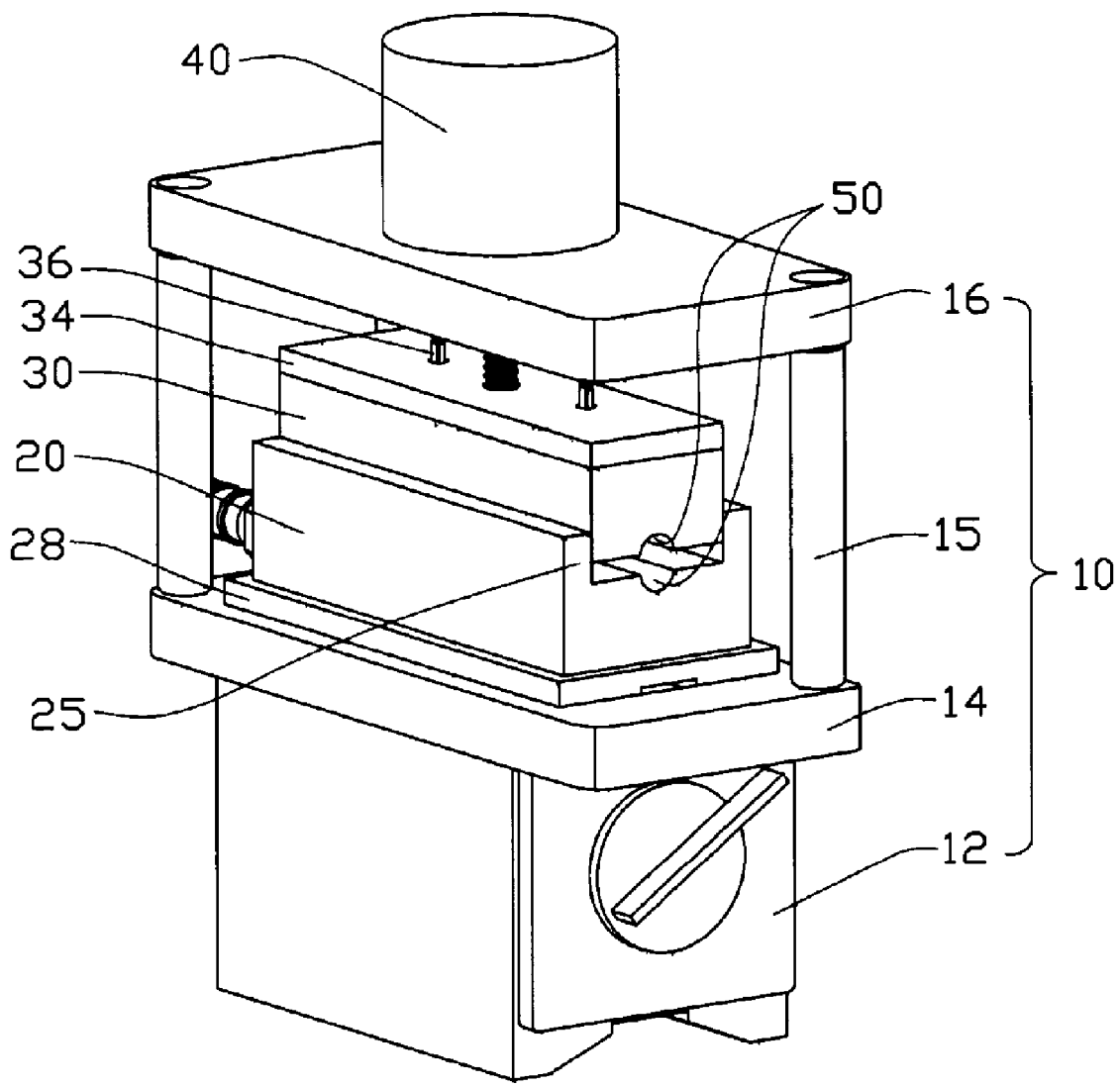
- FIG. 1 is an assembled view of a performance testing apparatus for heat pipes in accordance with a preferred embodiment of the present invention.
Figure 2:
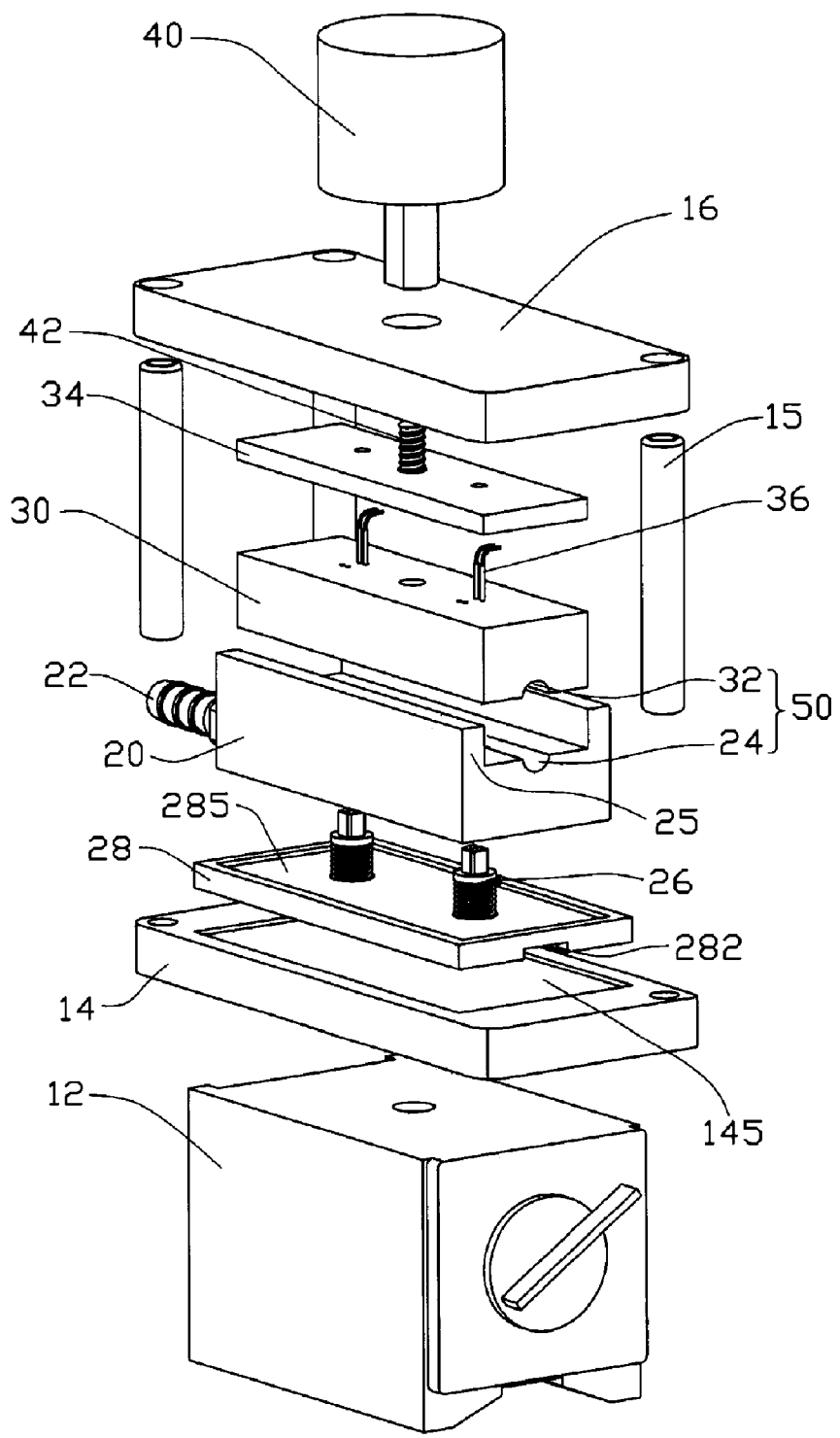
FIG. 2 is an exploded, isometric view of the testing apparatus of FIG. 1.
Figure 3A:
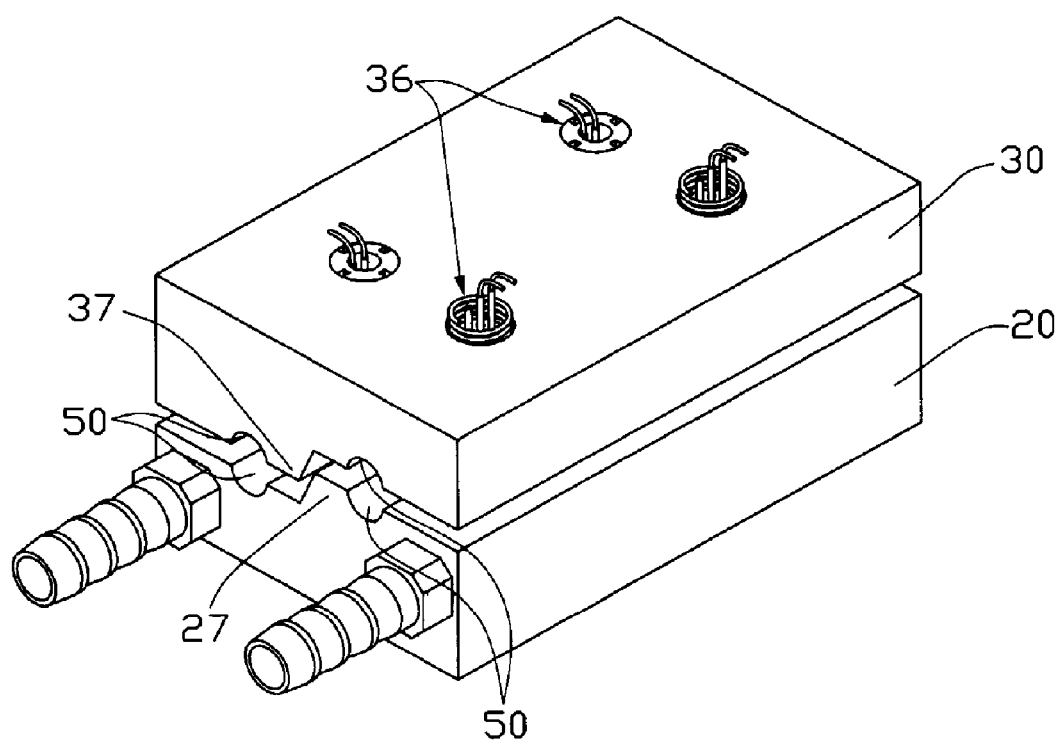
FIG. 3A shows an immovable portion and a movable portion of a performance testing apparatus for heat pipes in accordance with an alternative embodiment of the present invention.
Figure 3B:
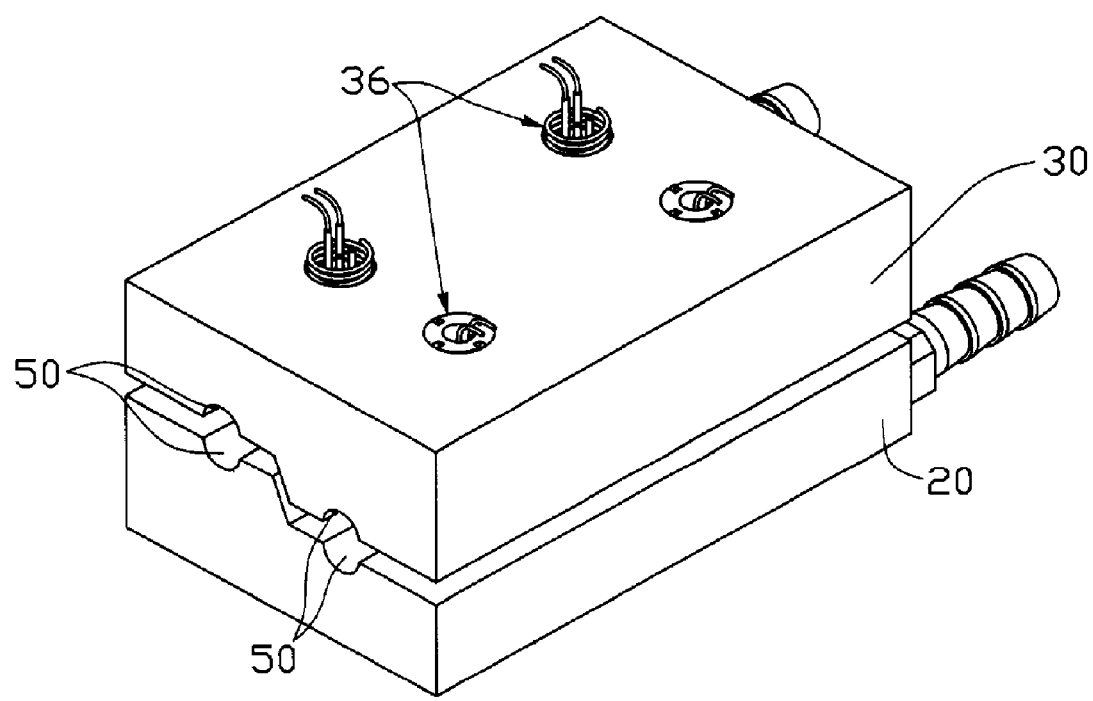
FIG. 3B shows the immovable portion and the movable portion of FIG. 3A from a different aspect.
Figure 3C:
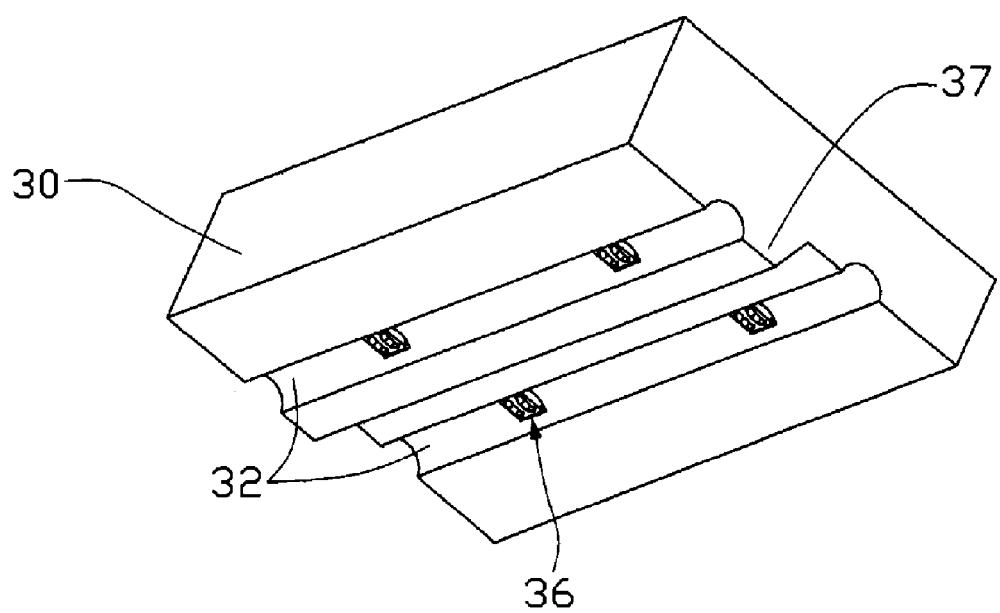
FIG. 3C shows the movable portion of FIG. 3A from a different aspect.
Figure 3D:
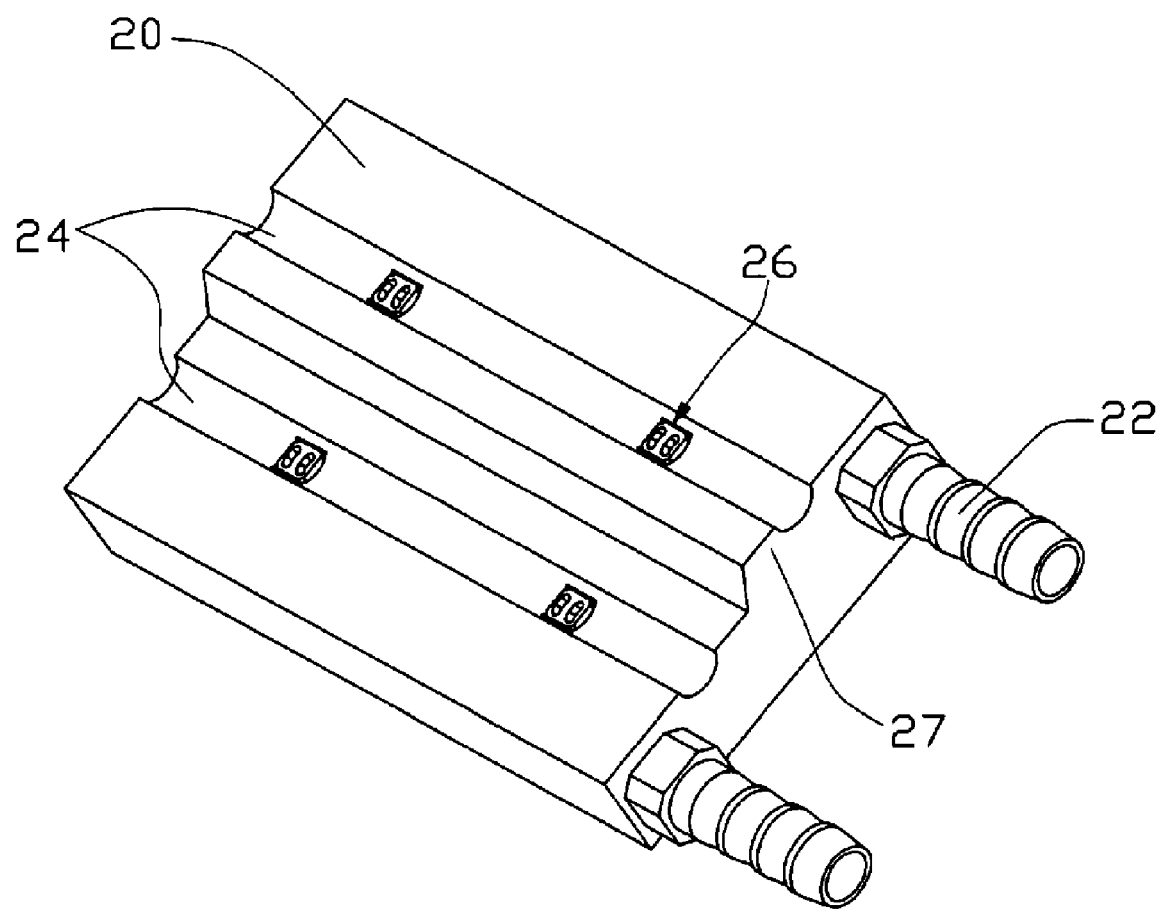
FIG. 3D shows the immovable portion of FIG. 3A from a different aspect.
Figure 4:
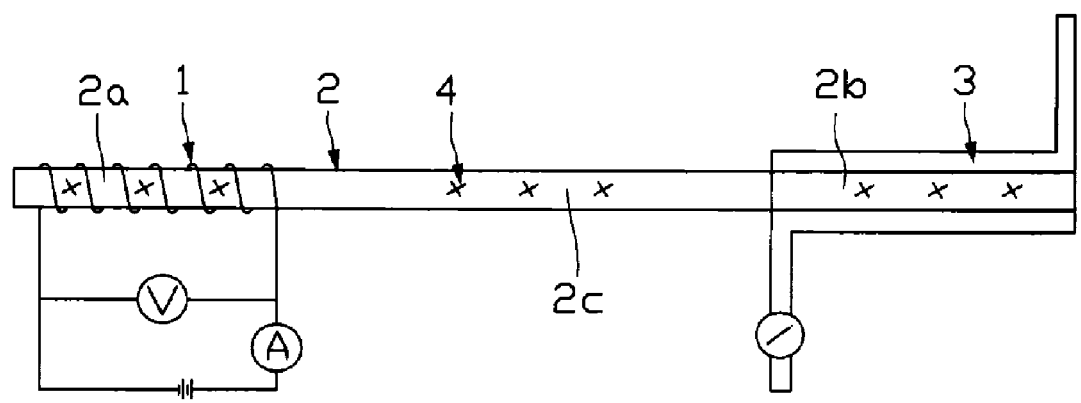
FIG. 4 is a conventional performance testing apparatus for heat pipes.

Referring to FIGS. 1 and 2, a performance testing apparatus for heat pipes comprises an immovable portion 20 and a movable portion 30 movably mounted on the immovable portion 20.

The immovable portion 20 has good heat conductivity and is held on a platform of a supporting member (not shown) such as a testing table or so on. Cooling passageways (not shown) are defined in an inner portion of the immovable portion 20, to allow coolant to flow therein. An inlet 22 and an outlet 22 communicate the passageways with a constant temperature coolant circulating device (not shown); therefore, the passageways, inlet 22, outlet 22 and the coolant circulating device corporately define a cooling system for the coolant circulating therein to remove heat from the heat pipe in test. The immovable portion 20 has a cooling groove 24 defined in a top face thereof, for receiving a condensing section of the heat pipe to be tested therein and removing heat from the heat pipe. Two temperature sensors 26 are inserted into the immovable portion 20 from a bottom thereof so as to position detecting portions of the sensors 26 in the cooling groove 24 and be capable of automatically contacting the heat pipe in order to detect a temperature of the condensing section of the heat pipe. In order to prevent heat in the immovable portion 20 from spreading to the supporting member, an insulating plate (not shown) is disposed between the immovable portion 20 and the supporting member.

The movable portion 30, corresponding to the cooling groove 24 of the immovable portion 20, has a positioning groove 32 defined therein, whereby a testing channel 50 is cooperatively defined by the cooling groove 24 and the positioning groove 32 when the movable portion 30 moves to reach the immovable portion 20. Thus, an intimate contact between the heat pipe and the movable and immovable portions 30, 20 defining the channel 50 can be realized, thereby reducing heat resistance between the heat pipe and the movable and immovable portions 30, 20. Two temperature sensors 36 are inserted into the movable portion 30 from a top thereof to reach a position wherein detecting portions of the sensors 36 are located in the positioning groove 32 and capable of automatically contacting the heat pipe to detect the temperature of the condensing section of the heat pipe.

The immovable portion 20 has two flanges 25 integrally extending upwardly from two opposite edges thereof and toward the movable portion 30. The two flanges 25 functions as positioning structure to positioning the movable portion 30 therebetween, which prevents the movable portion 30 from deviating from the immovable portion 30 in test of the heat pipes in mass production, thereby ensuring the grooves 24, 32 of the immovable and movable portions 20, 30 to always be aligned with each other. Thus, the channel 50 can be always precisely and easily formed for receiving the heat pipe for test. The movable portion 30 slidably contacts the two flanges 25 of the immovable portion 20 when it moves relative to the immovable portion 20. Alternatively, the movable portion 30 can has two flanges slidably engaging two opposite sides of the immovable portion 20 to keep the immovable portion 20 aligned with the movable portion 30.

The channel 50 as shown in the preferred embodiment has a circular cross section enabling it to receive the condensing section of the heat pipe having a correspondingly circular cross section. Alternatively, the channel 50 can have a rectangular cross section where the condensing section of the heat pipe also has a flat rectangular configuration.

Generally, in order to ensure that the heat pipe is in close contact with the movable and immovable portions 30, 20, a clamping member is applied to retain the movable portion 30 together with the immovable portion 20. The immovable portion 20 is fixed on the supporting member 10. A driving device 40 is installed on the supporting member 10 to drive the movable portion 30 to make accurate linear movements relative to the immovable portion 20 along a vertical direction, thereby realizing the intimate contact between the heat pipe and the movable and immovable portions 30, 20; thus, heat resistance between the condensing section of the heat pipe and the movable and immovable portions 30, 20 can be minimized.

The supporting member 10 comprises a seat 12 which according to the preferred embodiment is an electromagnetic holding chuck, by which the testing apparatus can be easily fixed at any desired position which is provided with a platform made of ferroalloy. A first plate 14 is secured on the seat 12; a second plate 16 hovers over the first plate 14; a plurality of supporting rods 15 interconnect the first and second plates 14, 16 for supporting the second plate 16 above the first plate 14. The seat 12, the first and second plates 14, 16 and the rods 15 constitute a mainframe for assembling and positioning the immovable and movable portions 20, 30 therein. The first plate 14 has the immovable portion 20 fixed thereon. In order to prevent heat in the immovable portion 20 from spreading to the first plate 14, an insulating plate 28 is disposed between the immovable portion 20 and the first plate 14. The first plate 14 has a top face defining a positioning concave 145 therein in which the insulating plate 28 is positioned. The insulating plate 28 defines a pond 285 in a top face thereof in which a bottom of the immovable portion 20 is positioned. The insulating plate 28 has an elongated slot 282 defined in a bottom face thereof, wherein the bottom face abuts the first plate 14, and two through holes (not labeled) vertically defined therethrough and communicating with the slot 282 for extension of wires 260 of the temperature sensors 26 to connect with a monitoring computer (not shown).

The driving device 40 in this preferred embodiment is a step motor, although it can be easily apprehended by those skilled in the art that the driving device 40 can also be a pneumatic cylinder or a hydraulic cylinder. The driving device 40 is installed on the second plate 16 of the supporting member 10. The driving device 40 is fixed to the second plate 16 above the movable portion 30. A shaft (not labeled) of the driving device 40 extends through the second plate 16 of the supporting member 10. The shaft has a threaded end (not shown) threadedly engaging with a bolt 42 secured to a board 34 of the movable portion 30. The board 34 is fastened to the movable portion 30. When the shaft rotates, the bolt 42 with the board 34 and the movable portion 30 is moved upwardly or downwardly. Two through apertures (not shown) are defined in the board 34 of the movable portion 30 for extension of wires (not labeled) of the temperature sensors 36 to connect with the monitoring computer. In use, the driving device 40 drives the movable portion 30 to make accurate linear movement relative to the immovable portion 20. For example, the movable portion 30 is driven to depart a certain distance such as 5 millimeters from the immovable portion 20 to facilitate the condensing section of the heat pipe which needs to be tested to be inserted into the channel 50 or withdrawn from the channel 50 after the heat pipe has been tested. In addition, the movable portion 30 can be driven to move toward the immovable portion 20 to thereby realize an intimate contact between the condensing section of the heat pipe and the immovable and movable portions 20, 30 during which the test is performed. Accordingly, the requirement for the testing, i.e. accuracy, ease of use and speed can be realized by the testing apparatus in accordance with the present invention.

It can be understood that positions of the immovable portion 20 and the movable portion 30 can be exchanged, i.e., the movable portion 30 being located on the first plate 14 of the supporting member 10, and the immovable portion 20 being fixed to the second plate 16 of the supporting member 10, and the driving device 40 is positioned to be adjacent to the movable portion 30. Alternatively, the driving device 40 can be installed to the immovable portion 20. In a further alternative, each of the immovable and movable portions 20, 30 has one driving device 40 installed thereon to move them toward/away from each other.

In use, the condensing section of the heat pipe is received in the channel 50 when the movable portion 30 is moved away from the immovable portion 20. Then the movable portion 30 is then moved to reach the immovable portion 20 so that the condensing section of the heat pipe is tightly fitted in the channel 50. The sensors 26, 36 are in thermal connection with the condensing section of the heat pipe; therefore, the sensors 26, 36 can work to accurately send detected temperatures of the condensing section of the heat pipe to the monitoring computer. Based on the temperatures obtained by the plurality of sensors 26, 36, an average temperature can be obtained by the monitoring computer very quickly; therefore, performance of the heat pipe can be very quickly decided.

Referring to FIGS. 3A-3D, an immovable portion 20 and a movable portion 30 in accordance with an alternative embodiment of the present invention is illustrated. The immovable portion 20 and the movable portion 30 have two channels 50 defined therein. The two channels 50 are separated from each other in a stepwise manner. Between the two channels 50, two positioning steps 27, 37 are respectively formed on the immovable portion 20 and the movable portion 30. The positioning steps 27, 37 have inclined faces contacting each other when the movable portion 30 moves to the immovable portion 20. In this case, the positioning steps 27, 37 function as positioning structure which avoids the movable portion 30 from deviating from the immovable portion 30 during movement of the movable portion 30 relative to the immovable portion 20, thereby ensuring that the channels 50 are precisely constructed between the immovable, movable portions 20, 30 for receiving the heat pipes for test. Alternatively, the channels 50 can be defined between the immovable and movable portions 20, 30 on a same level; correspondingly, the positioning structure (i.e., positioning steps 27, 37) is formed at edges of the immovable portion 20 and the movable portion 30.

Additionally, in the present invention, in order to lower cost of the testing apparatus, the movable portion 30, the insulating plate 28, the board 34, and the enclosure 60, 60a can be made from low-cost material such as PE (Polyethylene), ABS (Acrylonitrile Butadiene Styrene), PF(Phenol-Formaldehyde), PTFE (Polytetrafluoroethylene) and so on. The immovable portion 20 can be made from copper (Cu) or aluminum (Al). The immovable portion 20 can have silver (Ag) or nickel (Ni) plated on an inner face defining the groove 24 to prevent oxidization of the inner face.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:
    an immovable portion having a cooling structure defined therein for cooling the heat pipe requiring testing;
    a movable portion capable of moving relative to the immovable portion;
    a receiving structure being located between the immovable portion and the movable portion for receiving the heat pipe therein;
    a positioning structure extending from at least one of the immovable portion and the movable portion for avoiding the movable portion from deviating from the immovable portion during movement of the movable portion relative the immovable portion to ensure the receiving structure being capable of precisely receiving the heat pipe;
    at least a temperature sensor being attached to at least one of the immovable portion and the movable portion for thermally contacting the heat pipe in the receiving structure for detecting temperature of the heat pipe; and
    a supporting device wherein the supporting device comprises a seat for locating the testing apparatus at a required position, a first plate on the seat and having the immovable portion located thereon, and a second plate located above the movable portion and supported by a plurality rods extending from the first plate.

2. The testing apparatus of claim 1, wherein the receiving structure is at least a channel defined between the immovable portion and the movable portion.

3. The testing apparatus of claim 2, wherein the receiving structure comprises a channel corporately defined by a cooling groove in a face of the immovable portion and a positioning groove in a face of the movable portion confronting the immovable portion.

4. The testing apparatus of claim 2, wherein the positioning structure is two flanges extending from two opposite sides of the immovable portion toward the movable portion, the two flanges being capable of slidably contacting two opposite faces of the movable portion.

5. The testing apparatus of claim 2, wherein the receiving structure is two channels defined between the immovable portion and the movable portion, the two channels separating from each other in a stepwise manner.

6. The testing apparatus of claim 5, wherein the positioning structure is two positioning steps respectively extending from the immovable portion and the movable portion, the two positioning steps being located between the two channels and capable of slidably contacting each other.

7. The testing apparatus of claim 6, wherein the two positioning steps of the immovable portion and the movable portion each have an inclined face, the inclined faces of the two positioning steps being capable of slidably contacting each other.

8. The testing apparatus of claim 2, wherein the at least a temperature sensor has a portion thereof exposed to the channel.

9. The testing apparatus of claim 1, wherein an insulating plate is sandwiched between the immovable portion and the first plate of the supporting device.

10. The testing apparatus of claim 9, wherein the insulating plate defines a pond in a top face thereof, the immovable portion having a bottom positioned in the pond.

11. The testing apparatus of claim 9, wherein the first plate of the supporting device defines a concave in a top face thereof, the insulating plate has a bottom positioned in the concave.

12. The testing apparatus of claim 9, further comprising a driving device mounted on the second plate, the driving device connecting with the movable portion and capable of driving the movable portion to move away and towards the immovable portion.

13. The testing apparatus of claim 12, wherein the driving device connects with the movable portion via a bolt engaged with the movable portion, the driving device has a shaft extending through the second plate of the supporting device and engaging with the bolt.

14. The testing apparatus of claim 1, wherein the cooling structure comprises a coolant passageway defined in the immovable portion and inlet and outlet adapted for fluidically communicating with a coolant circulating device with the coolant passageway.

* * * * *